United States Patent
Kikuchi (10) Patent No.: US 7,889,325 B2
(45) Date of Patent: Feb. 15, 2011

(54) VEHICLE-PURPOSE OBJECT SENSING APPARATUS

(75) Inventor: Hayato Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1371 days.

(21) Appl. No.: 11/378,211

(22) Filed: Mar. 16, 2006

(65) Prior Publication Data

US 2006/0221228 A1 Oct. 5, 2006

(30) Foreign Application Priority Data

Mar. 17, 2005 (JP) ............ P. 2005-076276

(51) Int. Cl.
*G01C 3/08* (2006.01)
(52) U.S. Cl. ............. 356/5.01; 356/4.01; 356/4.1; 356/5.1; 356/5.15
(58) Field of Classification Search ....... 356/3.01–28.5; 342/70, 71; 340/435, 436
See application file for complete search history.

(56) References Cited

U.S. PATENT DOCUMENTS 6,195,157 B1 2/2001 Yamashita et al.
6,445,335 B1* 9/2002 Tamatsu ............... 342/70
2003/0076255 A1 4/2003 Ono
2004/0108952 A1* 6/2004 Ishii et al. ............ 342/174

FOREIGN PATENT DOCUMENTS

| EP | 1074853 | 2/2001 |
| JP | 3488610 | 6/1999 |
| JP | 2000-155168 | 6/2000 |
| JP | 2001-042034 | 2/2001 |

* cited by examiner

*Primary Examiner*—Thomas H Tarcza
*Assistant Examiner*—Luke D Ratcliffe
(74) *Attorney, Agent, or Firm*—O'Melveny & Myers LLP (57) ABSTRACT

In an object sensing member M1, while electromagnetic waves are transmitted from transmission members 1 and 2 to a predetermined region, based upon a result of receiving electromagnetic waves reflected from an object by reception members 3 and 4, a distance detecting member 5 detects at least a distance of the object. An abnormal condition judging member M2 judges that the object sensing member M1 is under abnormal condition, if a difference between a maximum value of reception levels of the electromagnetic waves received by the reception members 3 and 4, and a minimum value of these reception levels for a predetermined time measured by a time measuring member M3 is smaller than a predetermined threshold value. As a result, the abnormal condition judging member M2 can surely judge the abnormal condition even, if the vehicle is driven on a desert road where objects to be sensed are occasionally present.

6 Claims, 8 Drawing Sheets

VEHICLE-PURPOSE OBJECT SENSING APPARATUS

BACKGROUND OF THE INVENTION

The present invention is related to a vehicle-purpose object sensing apparatus equipped with object sensing member operated in such a manner that electromagnetic waves are transmitted from transmission members to a predetermined region, and a distance detecting member detects at least a distance of an object based upon a received result of reception members for receiving electromagnetic waves reflected from the object; and equipped with an abnormal condition judging member for judging an abnormal condition of the object sensing member based upon a reception level of the electromagnetic waves received by the reception member.

In order to judge such an abnormal condition that contamination such as mud, snow, and dust is attached to an object sensing member such as a radar apparatus, and then, a sensitivity of the object sensing member is lowered, a system is known from the below-mentioned patent publication 1. That is, when a reception level of reflection waves from an object is lowered than a measurement switching level, the object sensing member is directed to a direction of a guide rail on a road side, or a direction of a road surface, whereas when a reception level of reflection waves from the guide rail, or the road surface becomes higher than, or equal to a malfunction level, the system judges that the object sensing member is under normal operation, and when a reception level is lower than the malfunction level, the system judges that the object sensing member is under abnormal condition.

Another system is known. That is, while reception levels when an object sensing member senses objects are averaged for a predetermined time, when this averaged level value is larger than, or equal to a threshold value, the system judges that the objects sensing member is under normal condition, whereas when this averaged level value is smaller than the threshold value, the system judges that the object sensing member is under abnormal condition.

[Patent Publication 1]
Japanese Patent No. 3488610

On the other hand, the system described in the above-explained patent publication 1 owns the following problem. That is, while the system performs the abnormal condition judging operation by directing the object sensing member to either the side direction or the lower direction, such an object as a preceding-driven vehicle located in front of the own vehicle cannot be sensed. As a result, the operation of the system using the output of the object sensing member cannot be carried out.

Also, the system for judging the abnormal condition by comparing the temporal average value of the reception levels when the object sensing member senses the object with the threshold value owns the below-mentioned problems.

Figure 7:
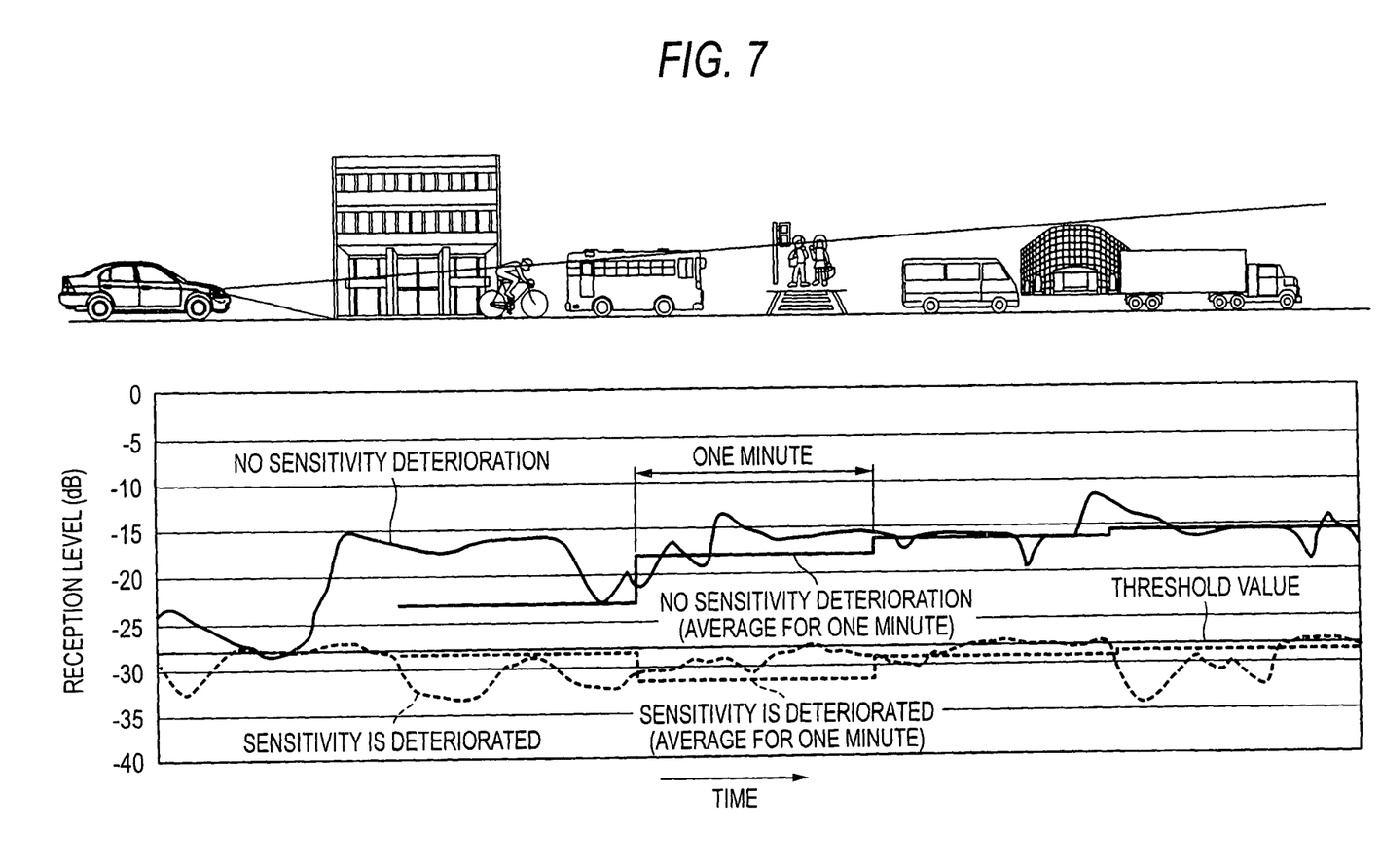
FIG. 7 is an explanatory diagram for explaining the conventional operations when the vehicle is driven in the town area.

FIG. 7 indicates a conventional abnormal condition judging method of an object sensing member, if a vehicle is driven in a town area. Since a large number of vehicles and a large number of buildings are sensed by the object sensing member in the town road, if the object sensing member is operated under normal condition and the sensitivity thereof is not lowered, the reception levels become high, and the averaged value thereof for 1 minute becomes larger than, or equal to the threshold value (for instance, −28 dB).

On the other hand, in the case that the sensitivity of the object sensing member is lowered due to malfunction and contamination by attaching thereto mud, snow, and dust, namely under abnormal condition, reception levels are lowered. Then, an averaged value of these reception levels for 1 minute becomes smaller than the threshold value. As a consequence, the system can firmly judge as to whether the sensitivity of the object sensing member is under normal state, or under abnormal state by comparing the averaged value of the reception levels for 1 minute with the threshold value.

Figure 8:
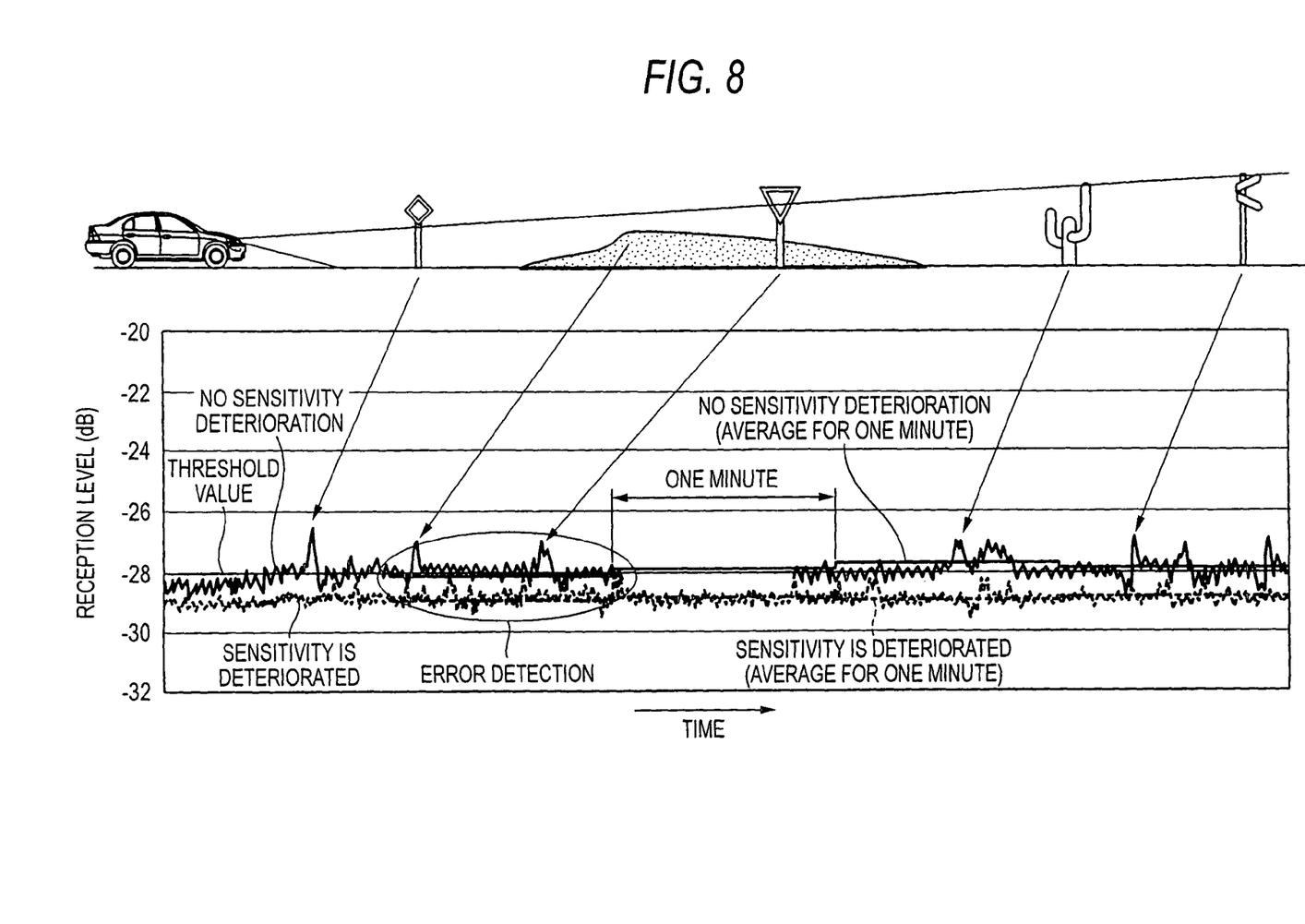
FIG. 8 is an explanatory diagram for explaining the conventional operations when the vehicle is driven in the desert area.

However, if the vehicle is driven on a desert road where a traffic amount is small, the conventional abnormal judging method owns the following problem. That is, as shown in FIG. 8, in the desert road where the traffic amount is small, substantially none of preceding-driven vehicles and building is sensed, but such an object as a road sign is occasionally sensed. As a result, such a condition that reception levels are high is produced only within a very short time and in a relative long time interval. As a consequence, an averaged value of these reception levels for 1 minute also becomes a value lower than the threshold value, so that an erroneous judging operation is made that the object sensing member is under abnormal condition.

SUMMARY OF THE INVENTION

The present invention has been made to solve the above-described problems, and therefore, has an object to provide a vehicle-purpose object sensing apparatus capable of firmly judging lowering of a sensitivity of an object sensing member even if a sensing frequency of an object is low.

To achieve the above-explained object, according to the Aspect 1, there is provided with a vehicle-purpose object sensing apparatus including: an object sensing member in which electromagnetic waves are transmitted from transmission members to a predetermined region, and a distance detecting member detects at least a distance of an object based upon a result of receiving electromagnetic waves reflected from the object by reception members, and an abnormal condition judging member for judging an abnormal condition of the object sensing member based upon a reception level of the electromagnetic waves received by the reception members, wherein the abnormal condition judging member judges as to whether or not the object sensing member is under abnormal condition based upon a difference between a maximum value and a minimum value of the reception levels of the electromagnetic waves received by the reception members.

Also, according to the Aspect 2, in addition to the arrangement of Aspect 1, there is provided with the vehicle-purpose object sensing apparatus, wherein the abnormal condition judging member judges that the object sensing member is under abnormal condition, if the difference between the maximum value and the minimum value of the reception levels is smaller than a predetermined threshold value.

Also, according to the Aspect 3, in addition to the arrangement of Aspect 1 or 2, there is provided with the vehicle-purpose object sensing apparatus further including: a time measuring member capable of measuring time, wherein the abnormal condition judging member judges that the object sensing member is under abnormal condition based upon the difference between the maximum value and the minimum value of the reception levels within a predetermined time measured by the time measuring member.

Also, according to the Aspect 4, in addition to the arrangement recited in any one of Aspects 1 to 3, there is provided with the vehicle-purpose object sensing apparatus further including: a drive distance detecting member for detecting a drive distance of the own vehicle, wherein the abnormal condition judging member judges that the object sensing member is under abnormal condition based upon the difference between the maximum value and the minimum value of the reception levels within a predetermined drive distance detected by the drive distance detecting member.

Also, according to the Aspect 5, in addition to the arrangement recited in any one of Aspects 1 to 4, there is provided with the vehicle-purpose object sensing apparatus further including: a vehicle speed detecting member for detecting a vehicle of the own vehicle, wherein the abnormal condition judging member judges that the object sensing member is under abnormal condition, if the vehicle speed detected by the vehicle speed detecting member is larger than or equal to a predetermined value.

It should be understood that both a light transmitting unit 1 and a transmitting light scanning unit 2 of an embodiment correspond to the transmission member; a light receiving unit 3 and a received light scanning unit 4 of the embodiment correspond to the reception members of the present invention; and a distance measuring process unit 5 of the embodiment corresponds to the distance detecting member of the present invention.

According to the arrangement of Aspect 1, since the abnormal condition judging member judges as to whether or not the object sensing member is under abnormal condition based upon the difference between the maximum value and the minimum value of the reception levels of the electromagnetic waves received by the reception members, the abnormal condition judging member can properly judge the abnormal condition even in the case that the vehicle is driven on the desert road where the objects to be sensed are occasionally present.

According to the arrangement of Aspect 2, since the abnormal condition judging member judges that the object sensing member is under abnormal condition, if the difference between the maximum value and the minimum value of the reception levels is smaller than a predetermined threshold value, the abnormal condition judging member can judge the abnormal condition of the object sensing member in high precision.

According to the arrangement of Aspect 3, the abnormal condition judging member judges that the object sensing member is under abnormal condition based upon the difference between the maximum value and the minimum value of the reception levels within a predetermined time measured by the time measuring member. As a result, since the predetermined time is set to such a time that an object such as a road sign is sensed at least 1 time, the abnormal condition judging member can firmly judge the abnormal condition of the object sensing member.

According to the arrangement of Aspect 4, the abnormal judging member judges that the object sensing member is under abnormal condition based upon the difference between the maximum value and the minimum value of the reception levels within a predetermined drive distance detected by the drive distance detecting member. As a consequence, since the predetermined drive distance is set to such a distance an object such as a road sign is sensed at least 1 time, the abnormal condition judging member can firmly judge the abnormal condition of the object sensing member.

According to the arrangement of Aspect 5, since the abnormal condition judging member judges that the object sensing member is under abnormal condition, if the vehicle speed detected by the vehicle speed detecting member is larger than or equal to a predetermined value, it is possible to avoid that the abnormal condition judging operation is carried out in deteriorated precision under such a condition that the reception level is not substantially changed due to the vehicle stop condition and the very slow drive condition.

DETAILED DESCRIPTION OF THE PREFERRED EMBODIMENTS

Various embodiment modes of the present invention will now be described based upon embodiments of the present invention shown in attached drawings.

Figure 1:
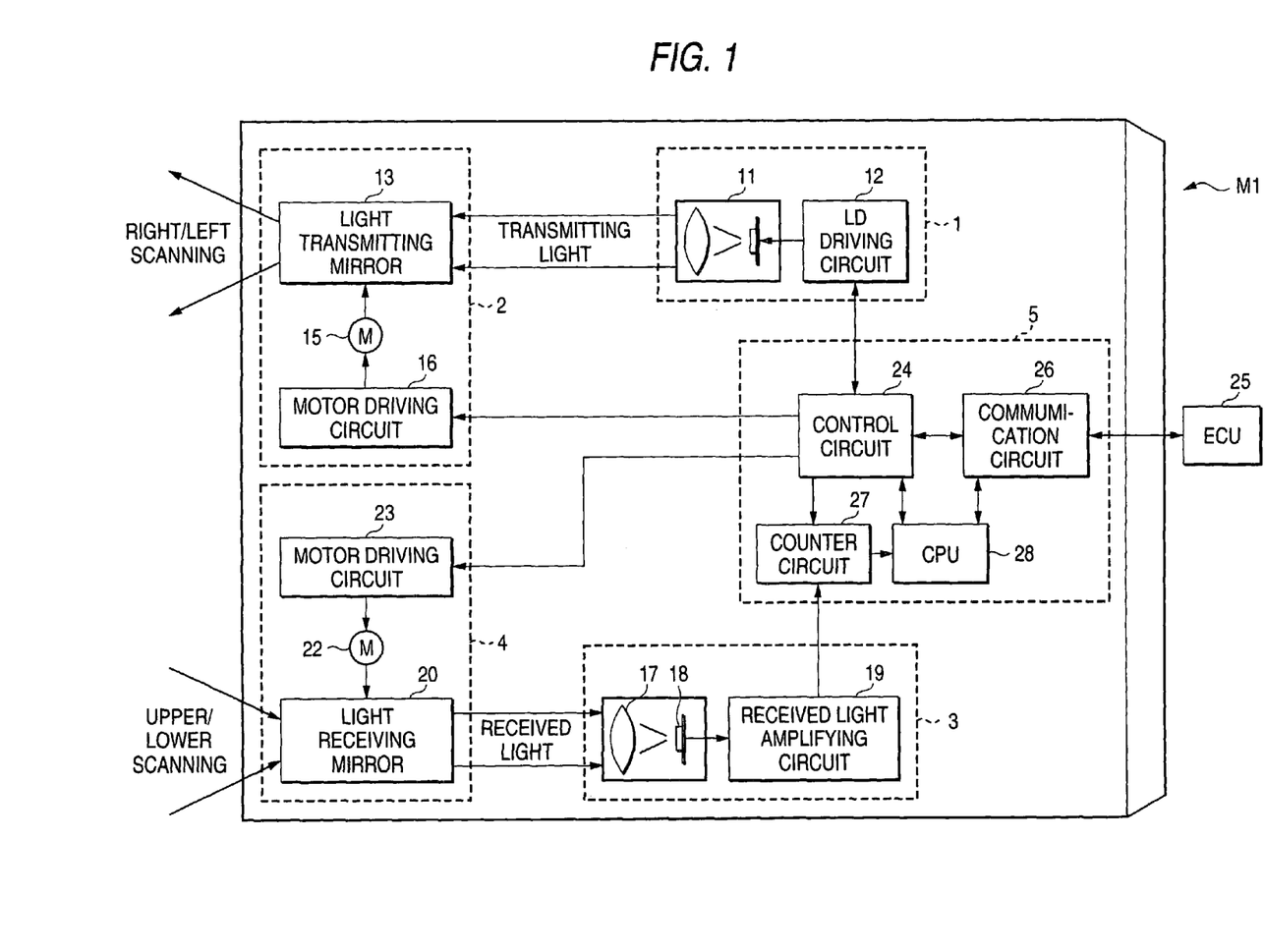
FIG. 1 is a block diagram of an object sensing member.
Figure 2:
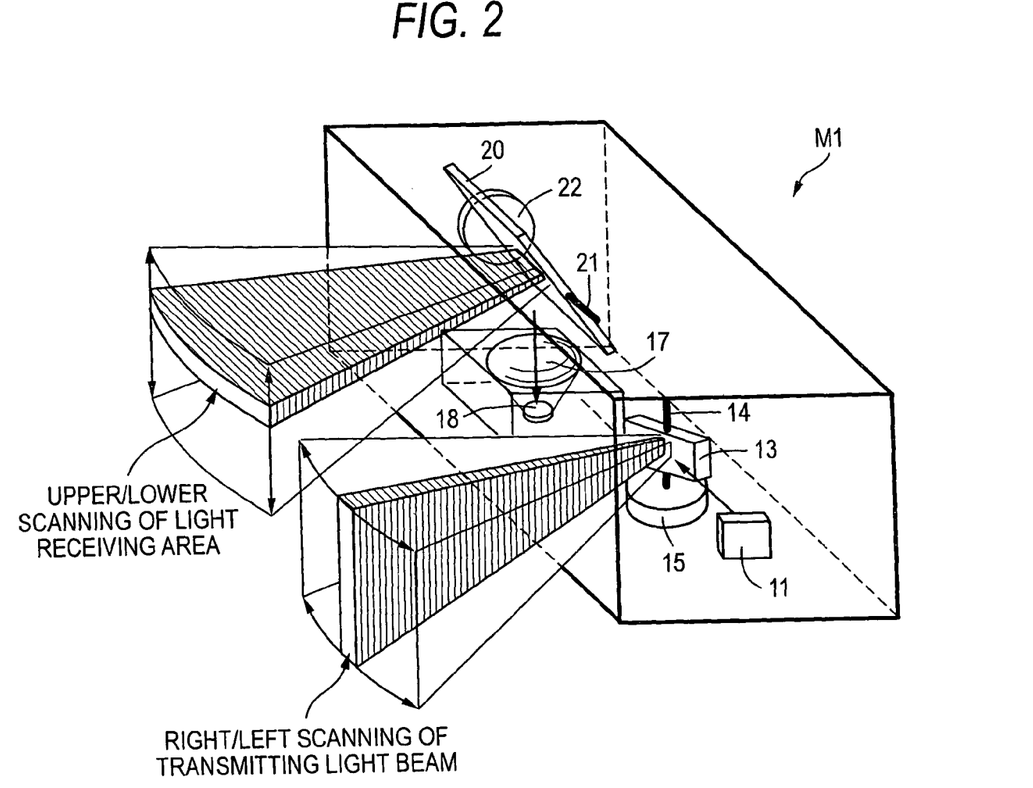
FIG. 2 is a perspective view of the object sensing member.
Figure 3:
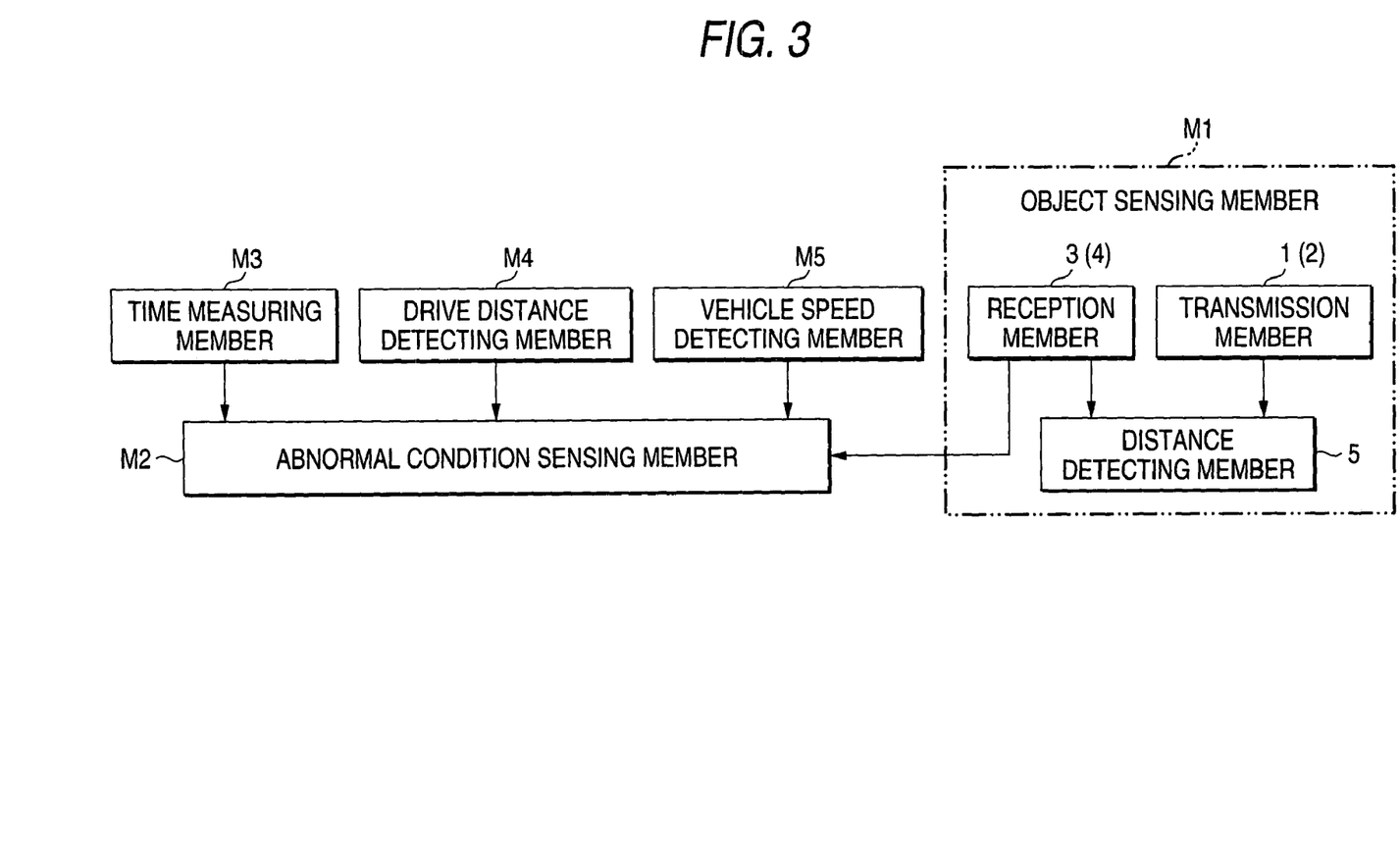
FIG. 3 is a claim corresponding diagram of the present invention.
Figure 4:
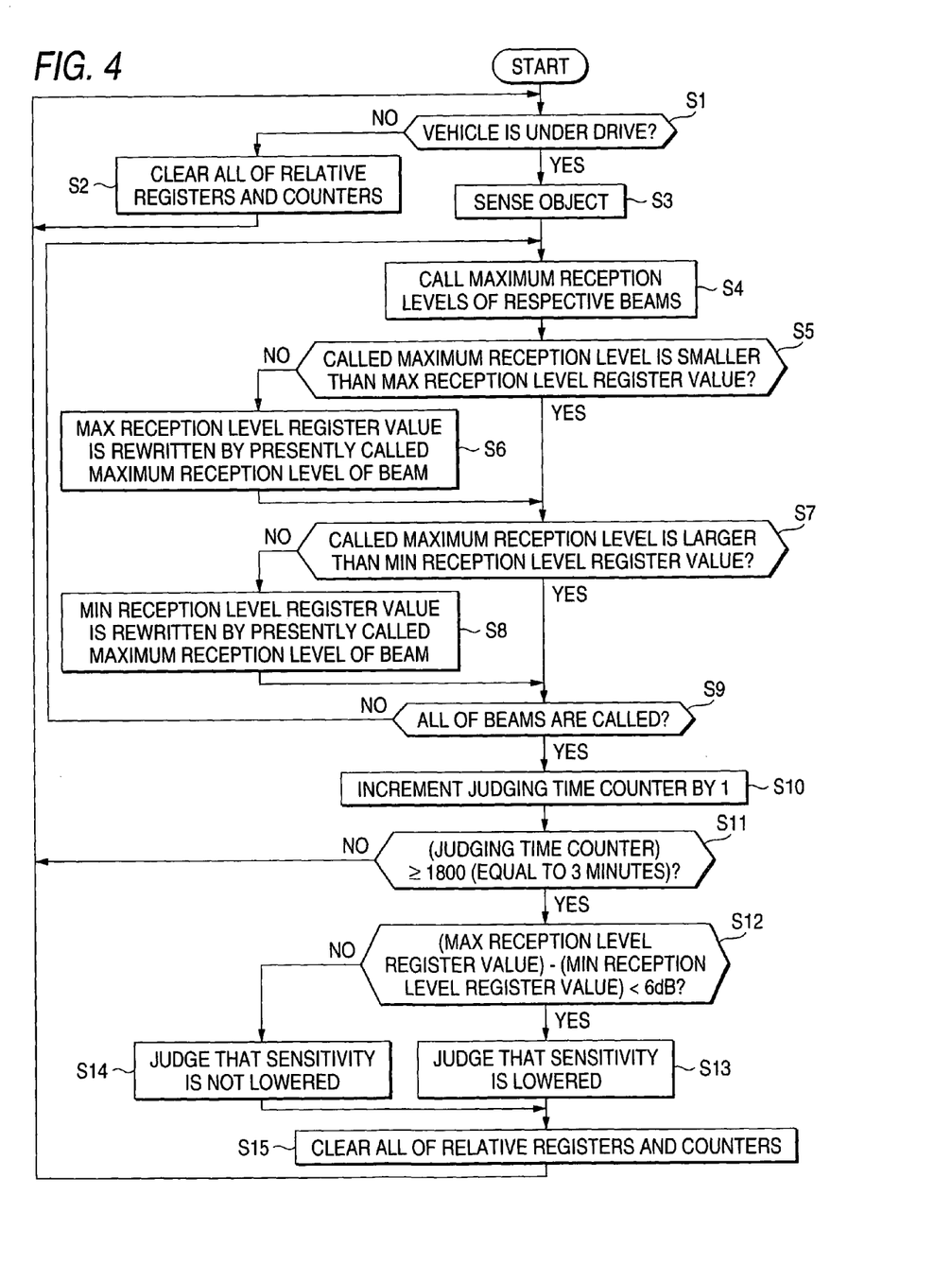
FIG. 4 is a flow chart for explaining operations.
Figure 5:
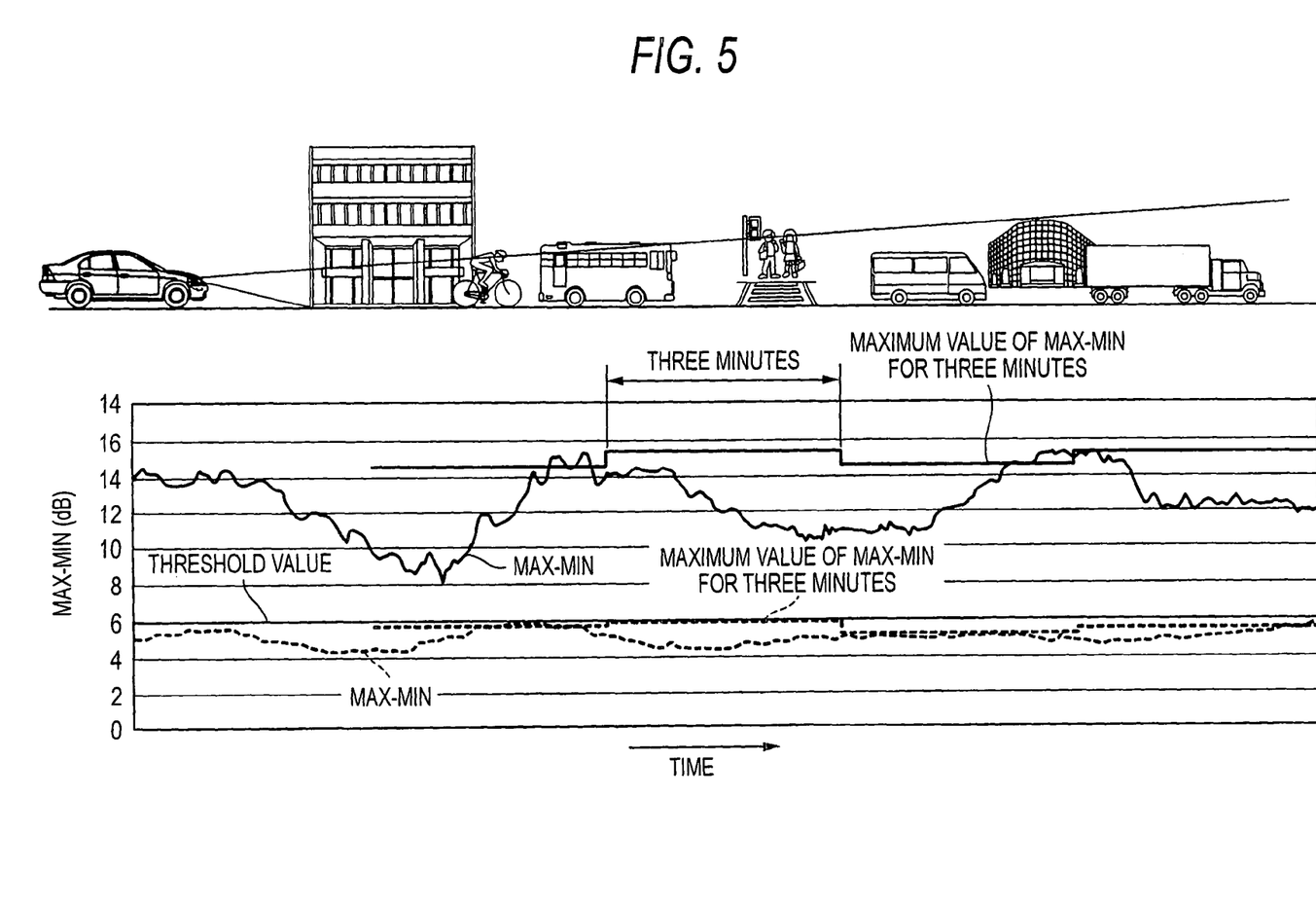
FIG. 5 is an explanatory diagram for explaining operations when a vehicle is driven in a town area.
Figure 6:
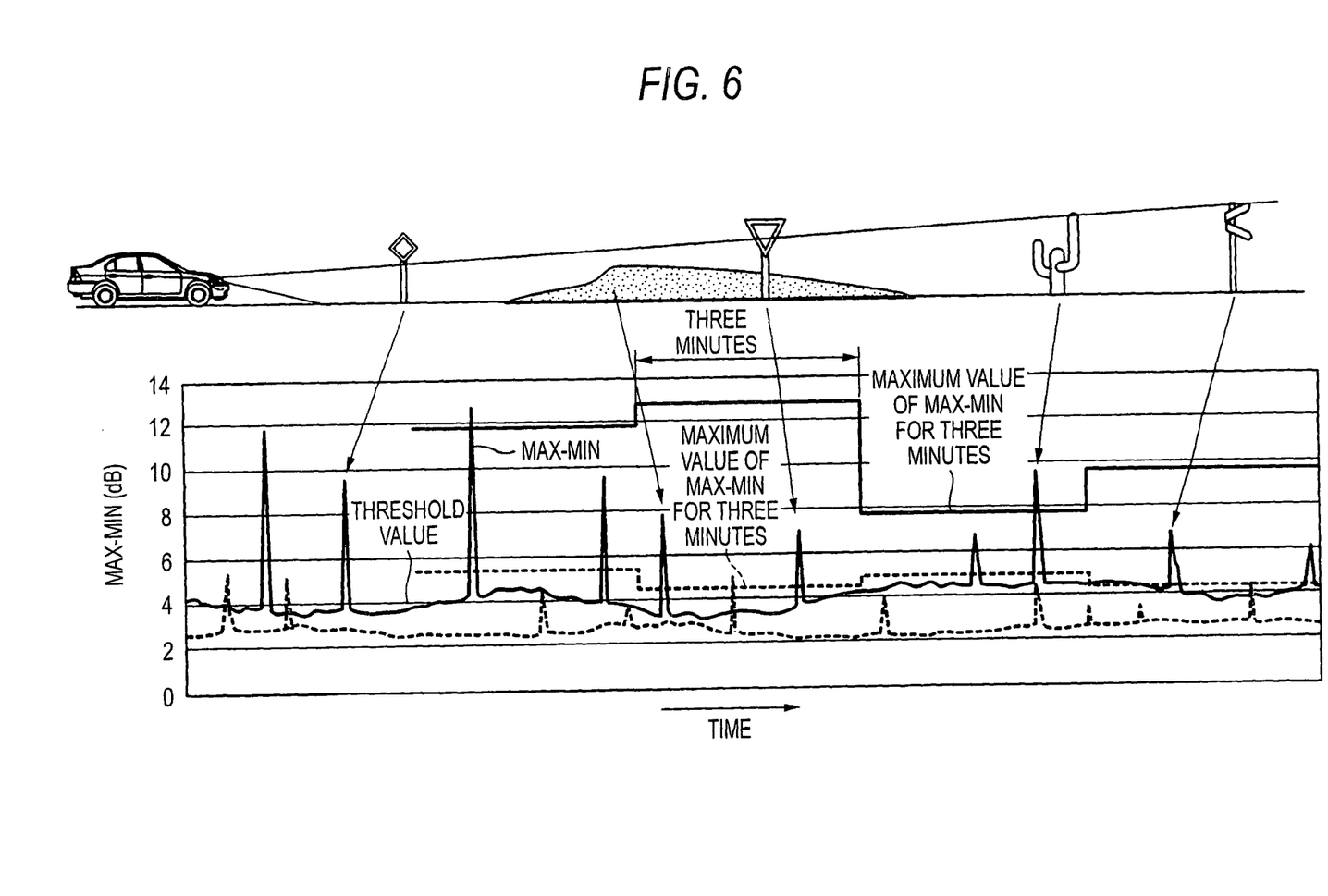
FIG. 6 is an explanatory diagram for explaining operations when the vehicle is driven in a desert area.

FIGS. 1 to 6 represent a vehicle-purpose object sensing apparatus according to an embodiment of the present invention. FIG. 1 is a block diagram of an object sensing member employed in the vehicle-purpose object sensing apparatus. FIG. 2 is a perspective view for showing the object sensing member. FIG. 3 is a schematic block diagram corresponding Claim structures of the present invention. FIG. 4 is a flow chart for describing operations of the vehicle-purpose object sensing apparatus. FIG. 5 is an explanatory diagram for explaining operations when a vehicle is driven in a town area. FIG. 6 is an explanatory diagram for explaining operations when the vehicle is driven in a desert.

As indicated in FIGS. 1 and 2, an object sensing member "M1" is constructed of a radar apparatus for sensing distances and directions of objects which are located in front of the own vehicle. The object sensing member M1 is arranged by a light transmitting unit 1, a transmitted light scanning unit 2, a light receiving unit 3, a received light scanning unit 4, and a distance measuring process circuit 5. The light transmitting unit 1 is equipped with a laser diode 11, and a laser diode driving circuit 12 which drives the laser diode 11. The laser diode 11 is provided with a light transmitting lens in an integral body. The transmitted light scanning unit 2 is equipped with a transmitting light mirror 13, a motor 15, and a motor driving circuit 16. The transmitting light mirror 13 reflects thereon laser light outputted from the laser diode 11. The motor 15 pivotally rotates the transmitting light mirror 13 in a reciprocation manner around an up/down shaft 14. The motor driving circuit 16 controls driving operations of the motor 15. A transmitted light beam derived from the transmitting light mirror 13 owns an elongated pattern along upper/lower directions while right/left widths of this transmitting light beam are restricted. The transmitting light beam is moved in the reciprocation manner along right/left directions so as to scan an object in a predetermined time period.

The light receiving unit 3 is equipped with a light receiving lens 17, a photodiode 18, and a received light amplifying circuit 19. The photodiode 18 receives reflection waves collected by the light receiving lens 17 and converts the received reflection waves into an electric signal. The received light amplifying circuit 19 amplifies the output signal of the photodiode 18. The received light scanning unit 4 is equipped with a light receiving mirror 20, a motor 22, and a motor driving circuit 23. The light receiving mirror 20 reflects the reflection waves from the object so as to conduct the reflected waves to the photodiode 18. The motor 22 pivotably rotates the light receiving mirror 20 in a reciprocation manner around a left/right shaft 21. The motor driving circuit 23 controls driving operations of the motor 2. A light receiving area having an elongated pattern along the right/left direction, the upper/lower widths of which are restricted, is moved in a reciprocation manner by the light receiving mirror 20 along the upper/lower directions in a predetermined period so as to scan the object.

The distance measuring process unit 5 is provided with a control circuit 24, a communication circuit 26, a counter circuit 27, and a central processing unit 28. The control circuit 24 controls the laser diode driving circuit 12, and the motor driving circuits 16 and 23. The communication circuit 26 is communicated with an electronic control unit 25 for controlling an adaptive cruise control apparatus. The counter circuit 27 counts a time duration from a laser light transmitting time up to a laser light receiving time. The central processing apparatus 28 calculates a distance measured from an object, and a direction of this object.

As a consequence, a portion where the transmitting light beam which is elongated along the upper/lower directions is intersected by the light receiving area which is elongated along the right/left direction constitutes an instantaneous sensing area. This instantaneous sensing area is moved over an entire sensing area in a zig-zag manner, which owns a right/left width which is equal to a right/left scanning width of the transmitting light beam and also owns an upper/left width which is equal to an upper/lower scanning width, so that the instantaneous sensing area scans an object. Then, a distance up to the scanned object is sensed based upon a time duration during which the transmitting light beam has been transmitted until the reflection light is received. This reflection light is produced by that the transmitting light beam is transmitted and then is reflected from the object. At this time, a direction of the scanned object is sensed based upon the instantaneous sensing area.

As apparent from FIG. 3, the object sensing member "M1" is equipped with a transmission member which is arranged by the light transmitting unit 1 and the transmitting light scanning unit 2, a reception member which is arranged by the light receiving unit 3 and the received light scanning unit 4, and a distance detecting member which is arranged by the distance measuring process unit 5. The reception member, a time measuring member "M3" for measuring time, a drive distance detecting member "M4" for detecting a drive distance of the own vehicle, and a vehicle speed detecting member "M5" for detecting a vehicle speed of the own vehicle are connected to an abnormal condition judging member "M2" for judging such an abnormal condition that a sensitivity of the object sensing member M1 is lowered.

Next, a description is made of operations of the vehicle-purpose object sensing apparatus according to this embodiment based upon a flow chart of FIG. 4.

First, when the vehicle is not under drive condition in a step S1, all of relevant registers and relevant counters are cleared in a step S2. When the vehicle is under drive condition in the above-described step S1, an object is sensed by the object sensing member M1 in a step S3. In the subsequent step S4, a maximum reception level of a beam for each of scanning operations is called. In a step S5, if the called maximum reception level is higher than a MAX reception level register value which has been stored in a MAX reception level register (not shown), then the MAX reception level register value is replaced by the presently called maximum reception level in a step S6. In other words, every time a maximum reception level becomes higher than the MAX reception level register value, the MAX reception level register value is updated by a maximum reception level which is higher than this MAX reception level register value. Also, if the above-described maximum reception level is lower than a MIN reception level register value which has been stored in a MIN reception level register (not shown) in a step S7, then the MIN reception level register value is replaced by the presently called maximum reception level in a step S8. In other words, every time the maximum reception level becomes lower than the MIN reception level register value, the MIN reception level register value is updated by the maximum reception level lower than this MIN reception level register value.

Then, if all of the beams which have been scanned during a predetermined time period (100 msec in embodiment) in a step S9, then a judging time counter (not shown) which constitutes the time measuring member M3 of the present invention is incremented by 1 in a step S10. When the counted value of the judging time counter becomes longer than, or equal to 1800 (equivalent to 3 min) in a step S11, such a value of the MAX reception level register value−the MIN reception level register value is compared with a predetermined reference value (6 dB in embodiment). Namely, a comparison is made between a value calculated by subtracting the MIN reception level register value from the MAX reception level register value, and the predetermined reference value. As a result of this comparison, if the MAX reception level register value−the MIN reception level register value<6 dB, then the abnormal condition judging member M2 judges that the sensitivity is lowered due to the abnormal condition of the object sensing member M1 in a step S13. To the contrary, if the MAX reception level register value−the MIN reception level register value≧6 dB, then the abnormal condition judging member M2 judges that lowering of the sensitivity does not occur due to the normal condition of the object sensing member M1 in a step S14. Thereafter, all of the relevant registers and the relevant counter are cleared in a step S15.

It should be understood that the time "3 minutes" counted by the judging time counter has been set as such a time that an object, for example, a road sign is sensed at least one time. As a result, the abnormal condition judging operation by the object sensing member M1 can be firmly carried out.

FIG. 5 illustratively shows a condition in the case that a vehicle is driven on a town road. Since a large number of vehicles and a large number of buildings are sensed by the object sensing member M1 in the town road, if the object sensing member M1 is operated under normal condition and the sensitivity thereof is not lowered, such a beam whose reception level is high is necessarily present, and at the same time, another beam whose reception level is low is also present. As a result, such a value calculated by "the MAX reception level register value−the MIN reception level register value" is changed at a large value. Accordingly, a maximum value as to "the MAX reception level register value−the MIN reception level register value" for every 3 minutes may becomes larger than, or equal to 6 dB which is equal to a threshold value for a judging operation.

On the other hand, in the case that the sensitivity of the object sensing member M1 is lowered due to contamination and malfunction, since a beam whose reception level is high is not present, such a value calculated by "the MAX reception level register value−the MIN reception level register value" is changed at a small value. Accordingly, a maximum value as to "the MAX reception level register value−the MIN reception level register value" for every 3 minutes may become smaller than 6 dB which is equal to the threshold value for the judging operation. As a consequence, since the maximum value as to "the MAX reception level register value−MIN reception level register value" for 3 minutes is compared with the threshold value, it is possible to firmly judge as to whether the sensitivity of the object sensing member M1 is under normal state, or abnormal state.

FIG. 6 illustratively represents a condition in the case that the vehicle is driven in a desert area. In a desert road where a traffic amount is small, substantially none of preceding-driven vehicles and buildings is sensed, but such an object as a road sign is occasionally sensed. However, if the sensitivity of the object sensing member M1 is under normal state, then a MAX reception level register value may instantaneously represent a large value when the object such as the road sign is occasionally sensed. Accordingly, an maximum value as to "the MAX reception level register value−the MIN reception level register value" for every 3 minutes may become larger than, or equal to 6 dB which is equal to the threshold value for the judging operation.

On the other hand, if the sensitivity of the object sensing member M1 is lowered due to contamination and malfunction, even when such an object as a road sign is occasionally sensed, a MAX reception level register value does not become a large value, but a maximum value as to "the MAX reception level register value−MIN reception level register value" becomes smaller than 6 dB corresponding to the threshold value for the judging operation. As a consequence, even when the vehicle is driven on the desert road, similar to such a case that the vehicle is driven on the town road, since the maximum value as to "the MAX reception level register value−MIN reception level register value" for 3 minutes is compared with the threshold value for the judging operation, it is possible to firmly judge as to whether the sensitivity of the object sensing member M1 is under normal state, or abnormal state.

While the embodiment of the present invention has been described, the present invention may be modified without departing from the technical scope of the present invention.

For instance, in the above-described embodiment, the abnormal condition judging operation has been carried out by comparing the maximum value as to "the MAX reception level register value−MIN reception level register value" for the predetermined time (3 minutes) with the threshold value, while the predetermined time is measured by the time measuring member M3. Alternatively, as another embodiment, the abnormal condition judging operation may be carried out by comparing such a maximum value as to "the MAX reception level register value−MIN reception level register value" in a predetermined drive distance of a vehicle with the threshold value, while the drive distance of the vehicle is detected by the drive distance detecting member M3 (refer to FIG. 3). In this alternative case, since the predetermined drive distance is set to such a distance over which an object such as a road sign may be sensed at least one time, an abnormal condition of the object sensing member M1 may be firmly judged.

As another embodiment, when a vehicle speed detected by the vehicle speed detecting member M5 is faster than, or equal to a predetermined vehicle speed, an abnormal condition judging operation may be carried out, whereas when a vehicle speed detected by the vehicle speed detecting member M5 is slower than the predetermined vehicle speed, the abnormal condition judging operation may be stopped. This reason is given as follows. That is, when the vehicle is stopped, or is under substantially stopping condition, the reception level of the beam is substantially not changed, so that precision of the abnormal condition judging operation is lowered.

What is claimed is:

1. A vehicle-purpose object sensing apparatus comprising:
an object sensing member (M1) in which electromagnetic waves are transmitted from transmission members (1, 2) to a predetermined region, and a distance detecting member (5) detects at least a distance of an object based upon a result of receiving electromagnetic waves reflected from the object by reception members (3, 4); and
an abnormal condition judging member (M2) for judging an abnormal condition of the object sensing member (M1) based upon a reception level of the electromagnetic waves received by the reception members (3, 4), and
a drive distance detecting member (M4) for detecting a drive distance of a vehicle, wherein
the abnormal condition judging member (M2) judges as to whether or not the object sensing member (M1) is under abnormal condition based upon a difference between a maximum value and a minimum value of the reception levels of the electromagnetic waves received by the reception members (3, 4), and
the abnormal condition judging member (M2) judges that the object sensing member (M1) is under abnormal condition based upon the difference between the maximum value and the minimum value of the reception levels within a predetermined drive distance detected by the drive distance detecting member (M4).

2. The vehicle-purpose object sensing apparatus according to the claim 1, wherein
the abnormal condition judging member (M2) judges that the object sensing member (M1) is under abnormal condition, if the difference between the maximum value and the minimum value of the reception levels is smaller than a predetermined threshold value.

3. The vehicle-purpose object sensing apparatus according to the claim 1, further comprising:
a time measuring member (M3) capable of measuring time, wherein
the abnormal condition judging member (M2) judges that the object sensing member (M1) is under abnormal condition based upon the difference between the maximum value and the minimum value of the reception levels within a predetermined time measured by the time measuring member (M3).

4. A vehicle-purpose object sensing apparatus comprising:
an object sensing member (M1) in which electromagnetic waves are transmitted from transmission members (1, 2) to a predetermined region, and a distance detecting member (5) detects at least a distance of an object based upon a result of receiving electromagnetic waves reflected from the object by reception members (3, 4);
an abnormal condition judging member (M2) for judging an abnormal condition of the object sensing member (M1) based upon a reception level of the electromagnetic waves received by the reception members (3, 4), and
a vehicle speed detecting member (M5) for detecting a speed of a vehicle, wherein
the abnormal condition judging member (M2) judges as to whether or not the object sensing member (M1) is under abnormal condition based upon a difference between a maximum value and a minimum value of the reception levels of the electromagnetic waves received by the reception members (3, 4), and
the abnormal condition judging member (M2) judges that the object sensing member (M1) is under abnormal condition, if the vehicle speed detected by the vehicle speed detecting member (M5) is larger than or equal to a predetermined value.

5. The vehicle-purpose object sensing apparatus according to the claim 1, wherein
the abnormal condition judging member (M2) judges that the object sensing member (M1) is under abnormal condition, if the difference between the maximum value and the minimum value of the reception levels is smaller than a predetermined threshold value.

6. The vehicle-purpose object sensing apparatus according to the claim 1, further comprising:

a time measuring member (M3) capable of measuring time, wherein
the abnormal condition judging member (M2) judges that the object sensing member (M1) is under abnormal condition based upon the difference between the maximum value and the minimum value of the reception levels within a predetermined time measured by the time measuring member (M3).

* * * * *